United States Patent [19]
Proulx

[11] Patent Number: 5,807,462
[45] Date of Patent: Sep. 15, 1998

[54] ASSEMBLY AND PROCESS FOR FORMING DOUBLE-STRAND MONOFILAMENT LINE FOR USE IN FLEXIBLE LINE TRIMMERS

[75] Inventor: Richard A. Proulx, Alta Loma, Calif.

[73] Assignee: Proulx Manufacturing, Inc., Rancho Cucamonga, Calif.

[21] Appl. No.: 782,333

[22] Filed: Jan. 13, 1997

Related U.S. Application Data

[63] Continuation-in-part of Ser. No. 597,178, Feb. 6, 1996.
[51] Int. Cl.⁶ ..................................... B29C 47/78
[52] U.S. Cl. .......................... 156/433; 156/441; 156/494; 156/498; 156/167
[58] Field of Search ..................................... 156/433, 441, 156/498, 494, 180, 181, 161, 244.27, 244.26, 166, 167

[56] References Cited

U.S. PATENT DOCUMENTS 3,690,978  9/1972  Nishizawa et al. ...................... 156/180

Primary Examiner—Michael W. Ball
Assistant Examiner—Michael A. Tolin
Attorney, Agent, or Firm—Lyon & Lyon LLP

[57] ABSTRACT

An assembly and process for continuously forming flexible cutting line for use in rotary vegetation trimmers of the type having two or more monofilament lines mounted on a common spool. The line produced by the present invention defines two monofilament strands joined together in a side by side relationship by a severable bond. The process includes the step of extruding one or more pairs of molten filament strands in proximate disposition through an extrusion die, directing the strands together about a collecting guide adjustably mounted in a cooling quench bath to initiate the forming of a severable weld between the adjacent strands. The elevation of the collecting guide within the quench tank is adjustable to vary the strength of the formed weld. The joined strands are then pulled in a parallel array through the quench bath and about a plurality of guide members therein to effect the crystallization and bonding together of the pairs of strands. The strands are then concurrently stretched and heated to effect parallel alignment of the molecular chain in the strands. The strands are again heated in a relaxed disposition, wetted and gathered on spools for storage and transportation.

24 Claims, 5 Drawing Sheets

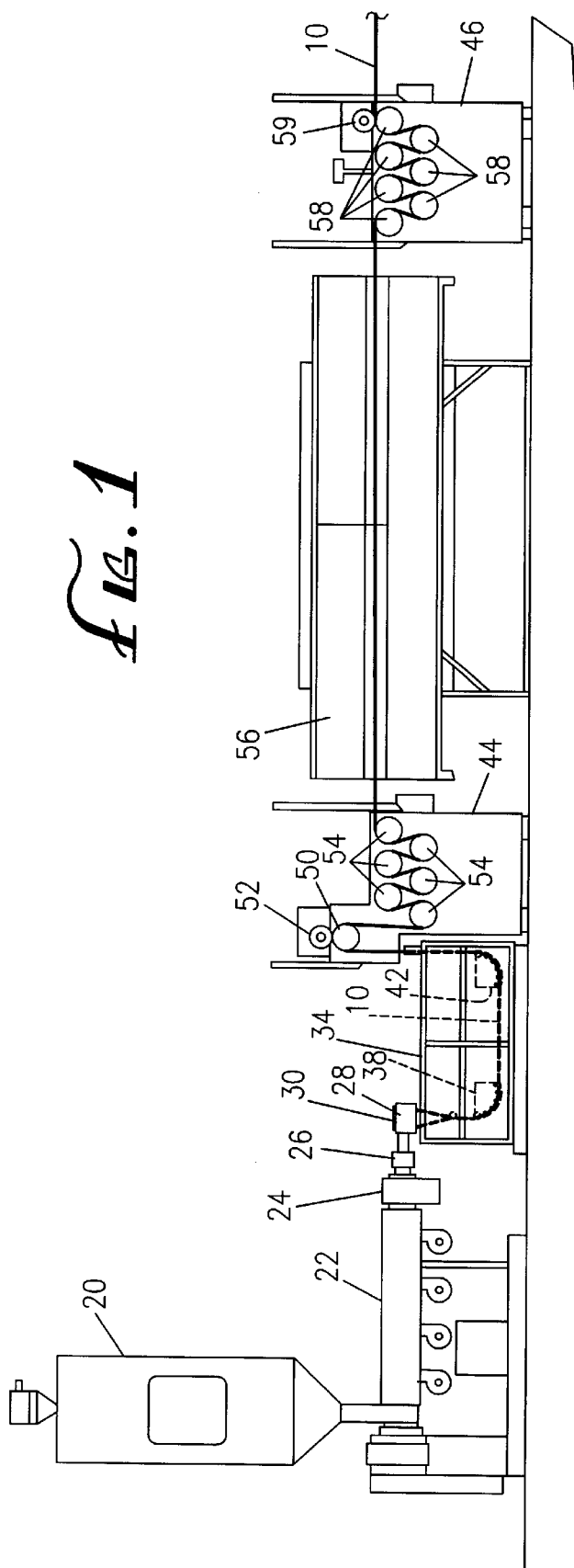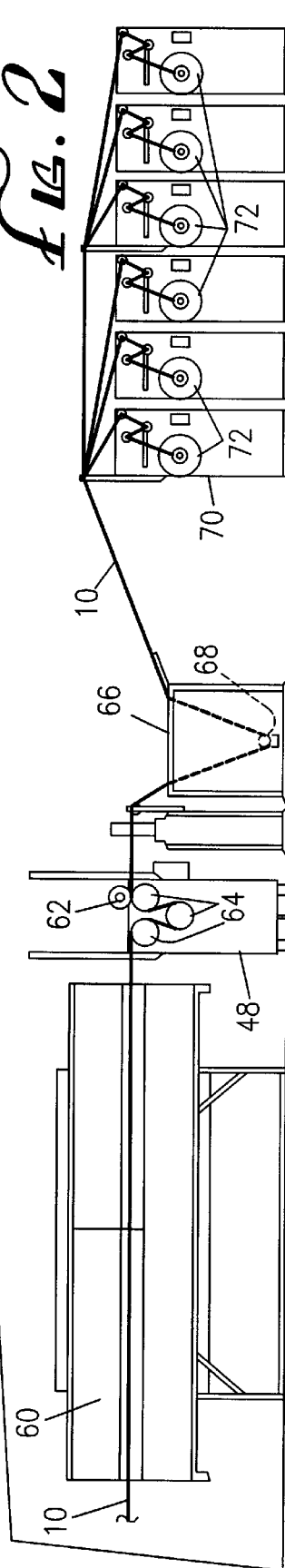

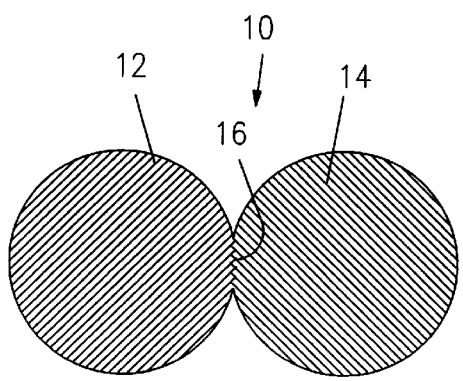
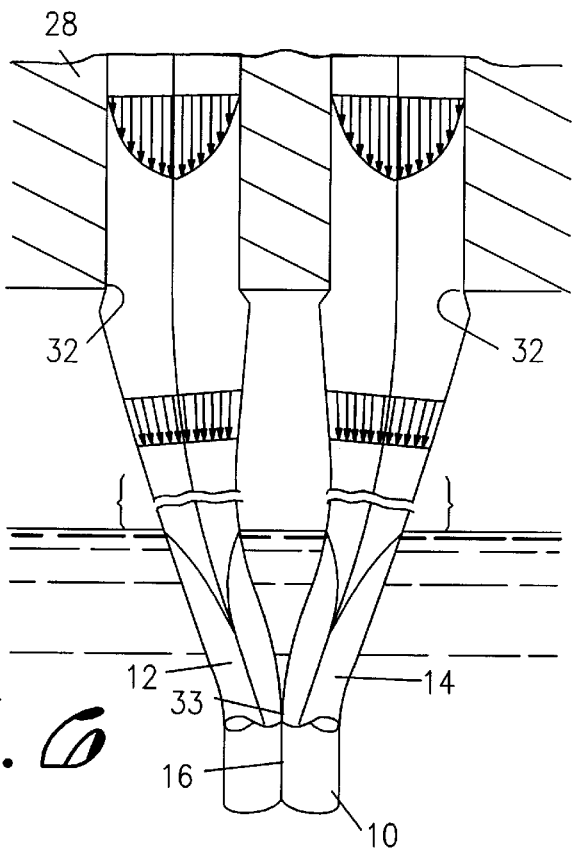
FIG. 3
FIG. 6
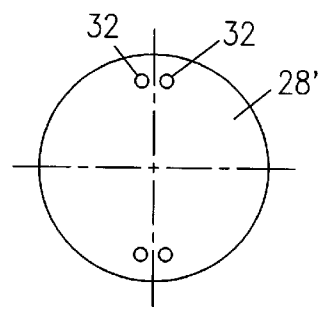
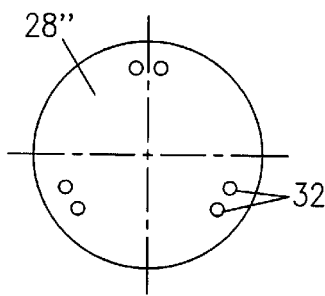
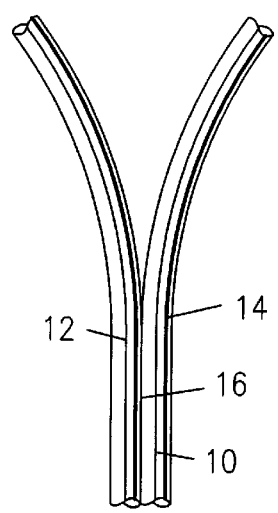
FIG. 7A  FIG. 7B  FIG. 4
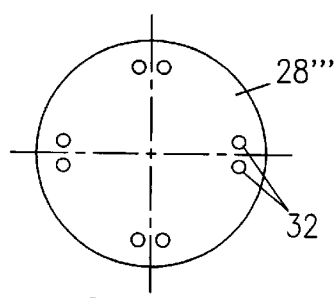
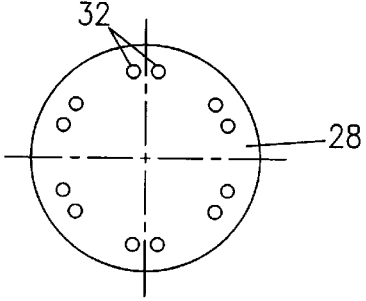
FIG. 7C  FIG. 7D

ASSEMBLY AND PROCESS FOR FORMING DOUBLE-STRAND MONOFILAMENT LINE FOR USE IN FLEXIBLE LINE TRIMMERS

This is a continuation-in-part of application, Ser. No. 08/597,178, filed Feb. 6, 1996 and entitled "Process For Forming Double-Stranded Monofilament Line For Use In Flexible Line Trimmers."

BACKGROUND OF THE INVENTION

The present invention is directed to an assembly and process for forming flexible cutting line for use in rotary trimmers which is comprised of two monofilament strands joined by a severable bond. Flexible line rotary trimmers are used for cutting vegetation such as grass and weeds, particularly along walks, fences and flower beds and around trees. These devices comprise a motor driven rotary head which carries one or more lengths of monofilament line mounted on a spool within a housing. Extended end portions of each line project from the spool through guides in the side of the housing. As the head rotates at high speed, the end portions of the lines are caused to project outwardly from the housing by the centrifugal forces acting thereon and function as cutting blades. The majority of trimmer heads presently in use employ two separate monofilament nylon lines which are both mounted on a common spool and project from the spool and housing through diametrically opposed guides in the trimmer head housing.

The spool which carries the line is mounted within the housing such that it rotates with the housing during use but can be selectively rotated relative the housing to pay out additional line when the projecting end portions of the line become worn or severed. Because these heads typically employs two separate cutting lines, and occasionally three or four such lines, care must be taken in winding the lines about the common spool to prevent the lines from crossing over one another or otherwise tangling within the housing. If the lines become tangled within the housing, additional line cannot be payed out during use or even pulled from the head without having to disassemble the head. This problem is particularly acute in fully automatic and bump-feed heads wherein even the slightest tangle can interfere with the proper indexing and paying out of the line. In addition to interfering with the proper line feeding mechanisms of the flexible trimmer heads, internal tangles can also cause balance and vibration problems which make the trimmer more difficult to use.

In an attempt to solve the problem of line tangle, efforts have been made to form a monofilament line comprised of two strands wherein the strands are secured together along their adjacent lengths by a suitable adhesive. The resulting double strand line is then simply wound about the spool and the end portions separated along their adhesive bond so that they can be fed out through the opposed guides. Bonding the two strands together in this manner along their entire lengths prevents tangling of the strands within the housing and, if the strands are properly joined, allows the strands to be readily separated for the feeding of new line through the opposed guides. This double-strand line, however, has been found to be excessively expensive to manufacture and the strength of the adhesive bond between the two strands can be inconsistent and cause premature separation of the strands. It would be highly desirable if such a dual-stand line could be provided which was economical to manufacture and wherein the bond joining strands together was continuous and of a uniform strength along its entire length. The process of the present invention provides such a line.

SUMMARY OF THE INVENTION

Briefly, the present invention comprises an assembly and process for forming one or more lengths of double-strand monofilament line which includes steps of extruding one or more pairs of molten monofilament strands wherein the strands in each pair are in proximate disposition, disposing the molten strands of each pair in an abutting side by side disposition within a cool quench bath to initiate the forming of a continuous weld therebetween while pulling the pairs of strands through the quench bath to initiate the crystallization and bonding together of the strands along the continuous weld to form a plurality of pairs of joined monofilament strands. By varying the vertical elevation within the quench bath of the point at which the two extruding strands in each pair are first directed together to initiate the formation of the weld, the strength of the final weld can be varied. The pairs of joined strands are pulled from the bath and concurrently heated and stretched as they are pulled through a heated oven to obtain the desired cross-sectional dimension and parallel molecular orientation. The strands are then reheated in a relaxed disposition as they are more slowly pulled through a second oven. The formed double-strand lines are next quenched by being pulled through a second bath to enhance their flexibility, toughness and impact resistance and then separately spooled.

It is the principal object of the present invention to provide monofilament line for use in flexible line trimmer heads of the type employing two or more cutting lines which reduces line crossover and tangling within the trimmer head housing.

It is another object of the present invention to provide a process and apparatus for economically manufacturing a line comprised of two monofilament strands joined together in a side by side relationship along a readily severable bond for use in flexible line trimmer heads of the type employing two or more cutting lines.

It is yet another object of the present invention to provide a process and apparatus for economically manufacturing a line comprised of two monofilament strands joined together in a side-by-side relationship along a readily severable bond for use in flexible line trimmer heads cutting lines wherein the strength of the bond between the monofilament strands can be varied.

These and other objects and advantages of the present invention will become readily apparent from the following detailed description of taken in conjunction with the accompanying drawings.

DESCRIPTION OF THE PREFERRED EMBODIMENT IN THE DRAWINGS

FIG. 1 is a schematic representation of a first portion of the manufacturing process of the present invention.

FIG. 2 is a schematic representation of the remainder of the manufacturing process of the present invention.

FIG. 3 is an enlarged cross-sectional view of a length of double-strand line formed in accordance with the present invention.

FIG. 4 is a perspective view of an end portion of a length of double-strand line formed in accordance with the present invention showing the end portion thereof being separated into its component strands for projection through opposed eyelets in the side wall of a rotary trimmer head housing.

FIG. 6 is a further enlarged schematic representation of the initial forming and bonding together of a pair of monofilament strands in accordance with the present invention.

FIGS. 7A–7D are top plan views of extrusion dies for use in the process of the present invention illustrating different hole patterns for producing different quantities of double-strand monofilament lines.

DESCRIPTION OF THE PREFERRED EMBODIMENT

Figure 5:
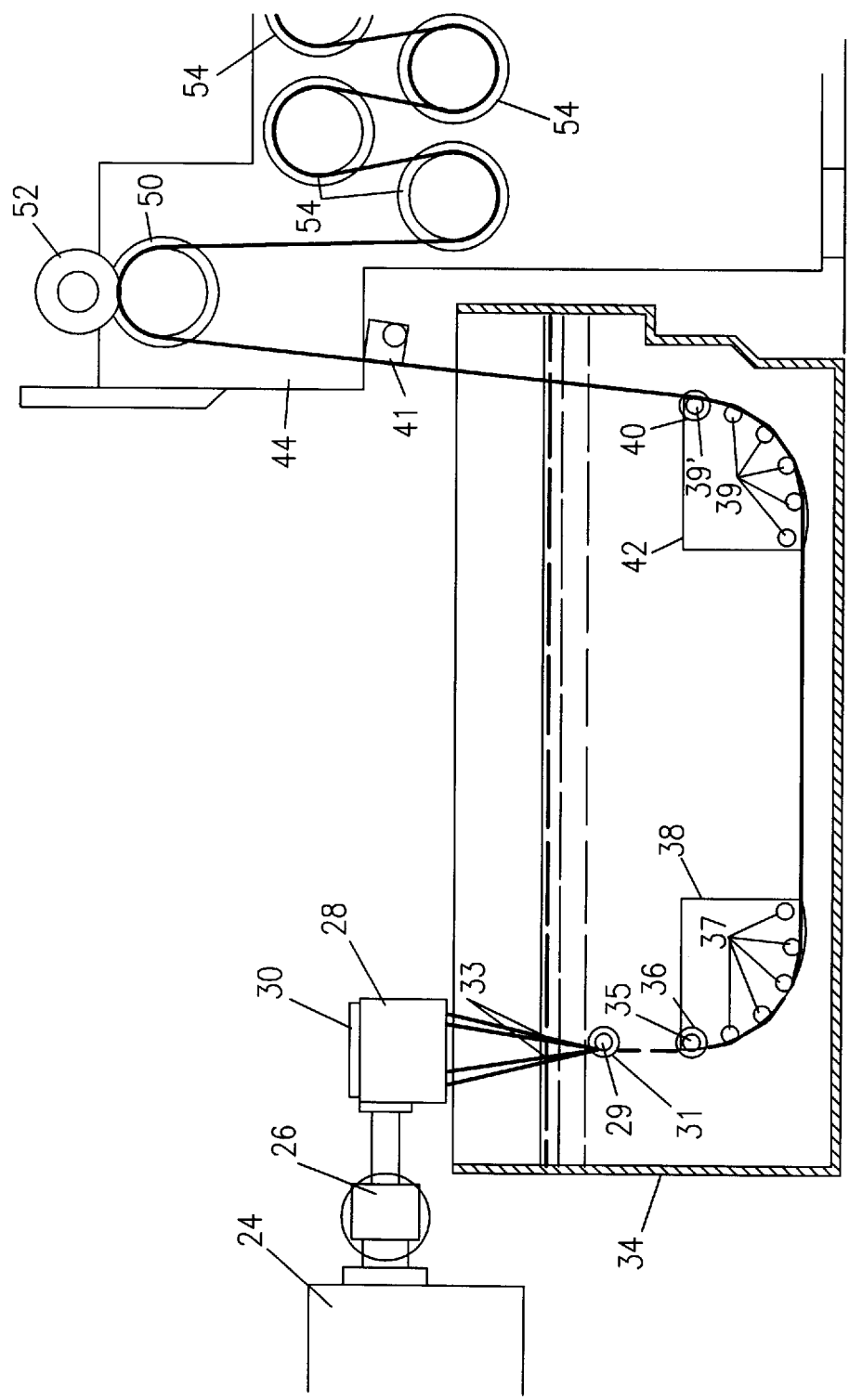
FIG. 5 is an enlarged schematic view of the filter assembly, metering pump, extrusion pot and first quench tank and illustrating the initial forming steps of double-strand monofilament line in accordance with the present invention.

Referring now in detail to the drawings, the process of the present invention is schematically represented in FIGS. 1 and 2. The result of the process is a double-strand monofilament line 10 comprised of a pair of monofilament strands 12 and 14 of constant diameter which are bonded together in a side by side relationship along a thin severable "weld" 16 as seen in FIG. 3. While weld 16 secures strands 12 and 14 together in parallel juxtaposition, it is readily severed by shearing forces. Thus, pulling the extended ends of strands 12 and 14 of line 10 in diverse directions will cause the strands to readily separate along the weld 16 as illustrated in FIG. 4. Accordingly, the double-strand line 10 can be easily wound about a trimmer head spool and stored thereon without risk of strand crossover or tangling due to the continual side by side securement of the component strands 12 and 14. Because the end portion of the line 10 can be readily separated by a shearing force into its component strands along a selected length, the two strands are easily separated and extended from the spool in opposed directions for insertion through opposed line guides or eyelets in the side wall of the trimmer head housing (not shown). The readily severable bond also allows the strands to be easily indexed through the opposed line guides in automatic feed and bump feed leads during use.

To obtain the aforesaid properties, line 10 is preferably constructed of a nylon copolymer material such as no. 8218 manufactured by Allied Signal, Inc. While other material compositions could be employed in carrying out the present invention, this material in a "solid stated" pellet configuration has been found to produce strong, durable and impact resistant cutting strands and a bonding weld having high tensile and low shear strength to provide the desired features discussed above. For line 10 comprised of strands having diameters up to about 0.080 in., a less expensive nylon homopolymer could be used such as no. 2065 by Allied Signal, Inc. Acceptable results can also be obtained at a lower cost in diameters over 0.080 in. by employing mixes of nylon copolymers and homopolymers. The use of the nylon copolymer material, without the addition of any homopolymer material, however, has been found to provide the strongest and most durable line.

In manufacturing the double-strand line 10 in accordance with the present invention, a supply of the nylon copolymer material is disposed in a hopper 20 and selectively fed through an extruder 22, a screen changer/filter assembly 24, a metering pump 26 and an extrusion die spin pack 28 disposed within pot 30. For each length of double-strand line 10 to be produced, die 28 defines a pair of spaced apertures 32. Examples of dies having different numbers of aperture pairs are shown in FIGS. 7A–7D. The extrusion die 28' illustrated in FIG. 7A will produce two lengths of double-strand monofilament line 10. Die 28" illustrated in FIG. 7B will produce three separate lengths of double strand line 10. Die 28'" illustrated in FIG. 7C will produce four separate lengths of line 10, etc. The particular location and/or orientation of each pair of apertures 32 in the extrusion die is not critical. It is, however, preferable to space each pair of apertures 32 substantially equidistantly apart on the die to minimize any inadvertent contact between the pairs of strands being extruded therethrough. The spacing between the two apertures 32 in each pair of apertures should be between 1/16 and 3/8 inch apart with the preferred spacing between apertures being 1/8 inch. As in the extrusion of single-strand monofilament line, the diameters of the individual apertures 32 in die 28 should be at least 50% greater than the desired final strand diameter. Examples of relative diameter sizes are shown in the following table.

| Strand Size (in.) | Pairs of Strands | Die Hole Size (in.) |
|---|---|---|
| .065 | 6 | .176 |
| .080 | 5 | .176 |
| .095 | 4 | .260 |
| .105 | 3 | .260 |
| .130 | 2 | .260 |

Variations in the strand size are obtained with a given diameter hole in the die, as seen above, by regulating the metering pump 26 and the line speed as in the manufacture of conventional single-strand monofilament line.

When the nylon polymeric material is extruded through the pairs of apertures 32 in extrusion die 28, a corresponding number of pairs of molten monofilament strands 12 and 14 are formed. Each pair of molten strands is directed downwardly from die 28 into a quench tank 34 filled with water which is maintained within the range of about 40° to 100° F., depending on the material being used, to effect crystallization of the nylon strands as they pass through the cooler water. If the line 10 is being constructed of the preferred nylon copolymer no. 8218 identified above, the water in tank 34 should be maintained within the range of 40° to 80° F. For smaller diameter line constructed of this material, such as 0.065–0.080 in., the water temperature should preferably be about 70° to 80° F. and most preferably at about 70° F. For larger diameter line such as 0.095–0.105 in., the water temperature should preferably be at about 60° to 70° F. and most preferably about 60° F. If the line were being formed of a nylon homopolymer, the water temperature need not be quite as cool as nylon homopolymers crystalize more quickly. For example, if the aforesaid nylon homopolymer no. 2065 were being used, the water should be maintained from about 70° to 100° F. Because this material crystallizes quickly, a preferred water temperature of 70° to 80° F. is employed with small diameter line such as 0.065–0.080 in. and most preferably the temperature should be about 70° F. With larger diameter line such as 0.095–0.105 in., the water temperature should be about 80° to 100° F. and most preferably about 80° F. A water cooling apparatus (not shown) is employed in tank 34 to maintain the water at the desired quenching temperature.

Figure 8:
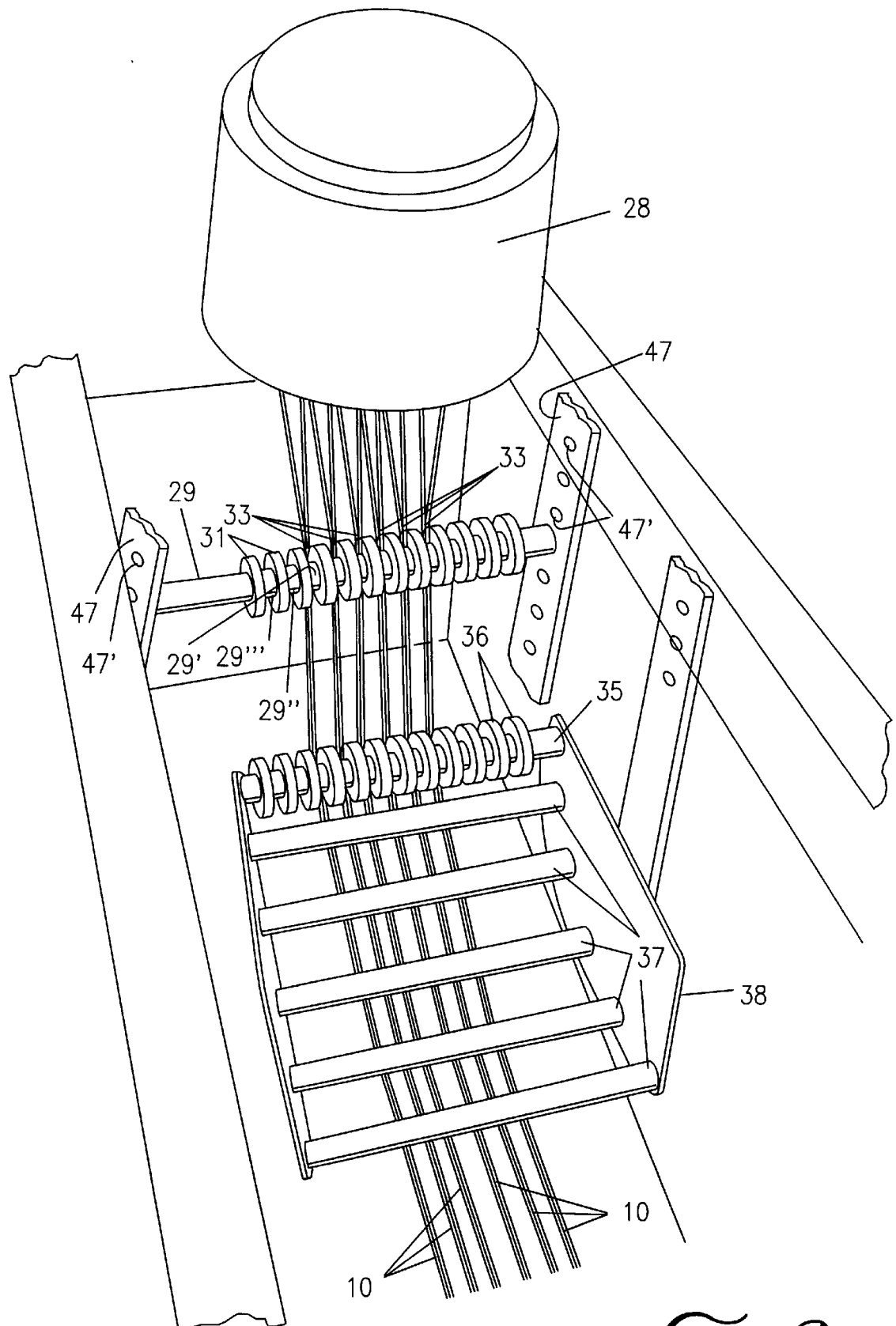
FIG. 8 is a perspective view of the upstream portion of the first quench tank showing the collecting guide and basket guide mounted therein for directing the lengths of double-strand line through the tank.

Within tank 34, the two extruded strands in each pair are initially directed downwardly from die 28 about a cylindrical collecting guide 29 between a pair of raised annular ridges 31 thereon. The spaced annular ridges 31 on the collecting guide 29 define a series of finger guides for separating the individual curvilinear guide surfaces 29', 29", etc., on guide 29 and joining together and aligning the pairs of strands about one of the guide surfaces. As each pair of strands is directed about one of the guide surfaces, e.g., 29' and between the spaced ridges 31 separating the individual guide surfaces, the ridges cause the strands in each pair thereof to be pressed gently together below the surface of the water in the quench tank while the strands are still in a semi-molten state to initiate the formation of weld 16. The initial bonding together of two strands in the formation of a length of line 10 is illustrated in FIGS. 6 and 8. The points at which the strands are initially pressed together adjacent roller guide 29 and where the welds 16 will continue to form are identified by the numeral 33. The pairs of strands 12 and 14 are then directed in an adjacent side by side disposition about a guide 35 and a series of rollers 37 which are mounted in a spaced curvilinear disposition in a basket or carriage 38 adjustably mounted in the lower upstream end of the quench tank 34. Guide 35 is of the same configuration as collecting guide 29 and defines a plurality of raised annular ridges 36 thereon which are spaced apart and define a second series of finger guides for maintaining the alignment of the pairs of joined strands in a spaced parallel array. The finger guides defined by both the first and second guides 29 and 35 could, of course, be formed by other means such as a plurality of annular or arcuate channels formed in a solid bar extending across carriage 38. The pairs of joined strands extend from carriage 38 in parallel alignment proximate the bottom of tank 34 and about a second plurality of rollers 39 mounted on a second carriage 42. The last roller 39' on carriage 42 preferably defines a guide and is of the same configuration as guides 29 and 35. From carriage 42, the pairs of strands are directed upwardly out of the quench tank 34, and through a sponge assembly 41 which strips excess water from the strands and is provided with a comb guide to maintain the alignment of the joined strands to a first roll stand 44. Roll stand 44 pulls the parallel array of the forming lengths of double-strand line 10 from the extrusion die 28 through the quench bath 34 and cooperates with a second roll stand 46 and a third roll stand 48 to move the lengths of line 10 through the forming process as will be explained.

Figure 9:
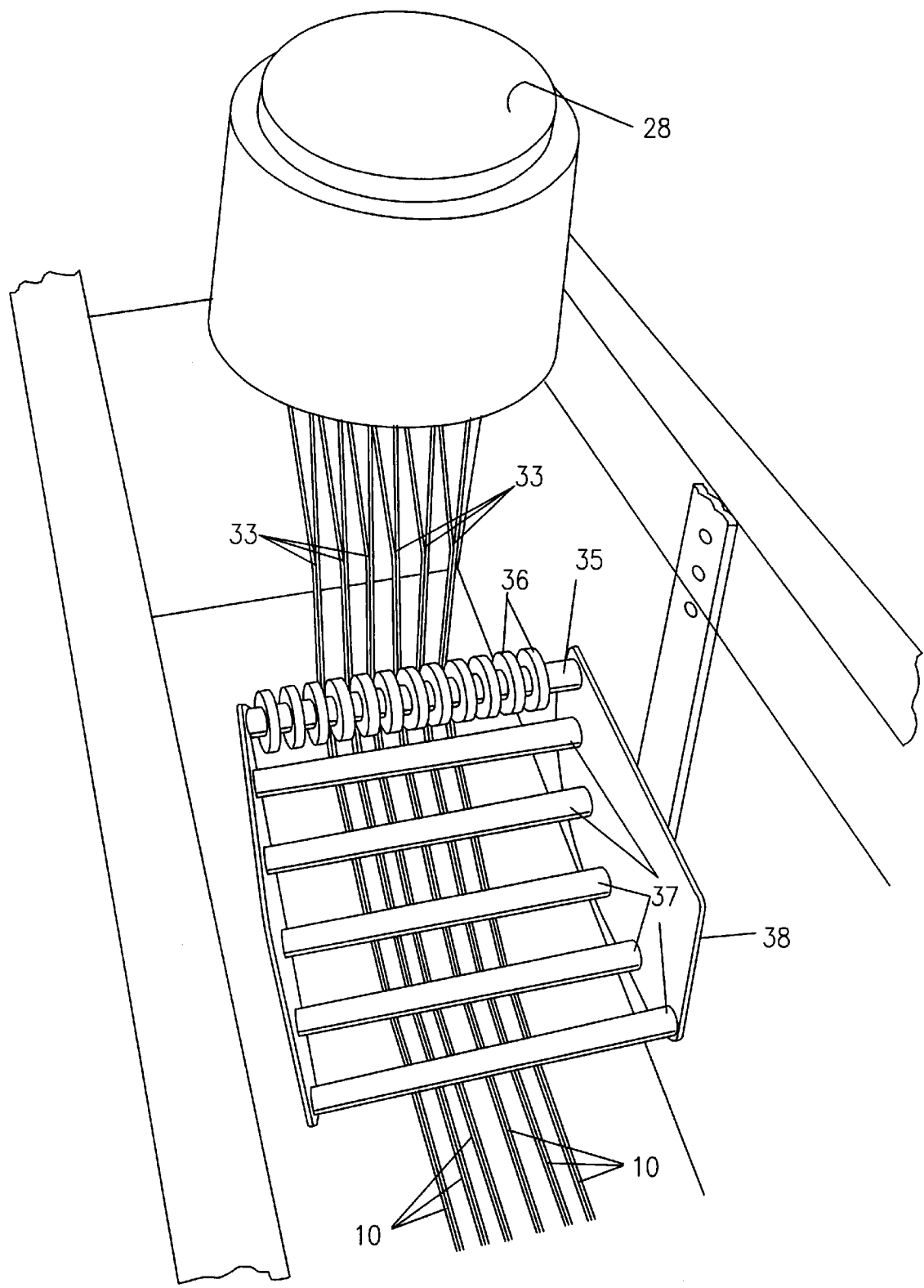
FIG. 9 is a prospective view similar to FIG. 8 but without the collecting guide.

As noted above, during the initial start-up of the line forming process, the two strands 12 and 14 in each length of line 10 being formed are physically pressed gently together at 33 by the ridges 31 on the first roller guide 29 to initiate the formation of the continuous weld 16. Alternatively, the process can be conducted without the use of the collecting guide 29. Without guide 29, the two strands 12 and 14 in each pair are physically pressed together at 33 to initiate the formation of weld 16. This is done manually and such a set up is illustrated in FIG. 9. When the strands were manually pinched together, points 33 were typically located about two to four inches below the surface of the water in tank 34. With the use of collecting roller 29, this distance can be varied by adjustably mounting roller 29 within tank 34. By varying the distance of points 33 below the surface of the water, the strength of the final weld can be varied and differences in strand diameters can be accommodated to provide welds of constant strength. Points 33 are typically adjacent or slightly above roller 29 and will not vary to any appreciable extent during operation. Different trimmer manufacturers and users may prefer welds of different strengths depending on the size of the line and the size or power of the trimmer. In addition, smaller line will quench more quickly requiring a shallower positioning of point 33 to obtain the same strength weld than would be required with larger line to obtain a weld of the same strength. By allowing the distance between collecting roller 29 and the surface of the water in tank 34 to vary between two and fifteen in this excellent control over the strength of weld 16 can be obtained for all conventional line sizes.

The variable mounting of guide 29 in tank 34 is provided by a pair of flat bars 47 vertically mounted within tank 34 adjacent the opposite side walls thereof. Bars 47 are provided with a plurality of aligned spaced apertures 47' adapted for alignment with the opposite ends of guide 29 whereby guide 29 can be secured at the desired elevation by means of threaded securement members extending through apertures 47' and threadably engaging the ends of guide 29. Other adjustable mounting means could, of course, also be employed. In addition to varying the elevation of points 33 to effect a change in the strength of welds 16, the adjustable mounting of guide 29 also accommodates changes in the temperature of the quench bath. The water within tank 34 is heated over time by the semi-molten strands moving therethrough. As the temperature of the water increases, the guide 29 can be lowered within the tank to increase the exposure of the semi-molten strands to the quenching effects of the water prior to the joining together of the adjacent strands. In addition, some materials will crystallize more quickly than others. For more viscous materials which typically crystallize more slowly, the first roller guide 29 should be located at a lower elevation than for less viscous materials which generally crystallize more rapidly. In addition, smaller diameter strands, such as 0.065–0.080 in., will crystallize more quickly for a given material than strands having a larger diameter. If the aligned material crystallizes too quickly, the resulting bond can be too weak to withstand processing. The strength of the weld is based on the combination of viscosity, crystallinity and strand diameter. For a given material, the closer the contact point 33 is to the surface of the water, the stronger is the bond between the strands. The ability to vary the depth of points 33 in tank 34 through the adjustably mounted collecting guide 29 enables the manufacturer to provide the desired strength in weld 16 despite all these variables which would otherwise affect the bonding together of the two strands 12 and 14.

As the bonding strands extend from the collecting guide 29 and about the guide 35 and rollers 37, the ridges 36 on the guide 35 maintain each pair of joined crystallizing strands together as they pass thereover so that as roll stand 44 continually pulls the pairs of adjacent strands through the quench bath, the strands will continue to crystalize and the welds 16 will continue to form at points 33 and thus extend along and continuously bond together the pairs of strands 12 and 14 to form the lengths of double-strand line 10. Because the pairs of strands will continue to come together at points 33 and form continuous welds 16, it is not necessary to press the two strands together down stream of collecting guide 29. Guides 35 and 39' are employed to maintain the parallel alignment of the formed dual lines as they pass through the quench tank 34.

Roll stand 44 comprises an elevated drive roller 50 and a pinch roller 52 for pulling the joined strands upwardly from tank 34, and two rows of vertically and laterally spaced additional drive rollers 54 which cooperate with rollers 50 and 52 to pull the pairs of joined strands through the quench bath. The drive rollers in each of the three roll stands are preferably constructed with a stainless steel outer surfaces, while the pinch rollers preferably have a hard rubber surface to provide the desired gripping and durability characteristics. As seen in FIGS. 1 and 5, the parallel array of spaced lines 10 extend from tank 34 between drive roller 50 and pinch roller 52, downwardly therefrom and about the two rows of drive rollers 54 and laterally therefrom into a first oven 56. The second roll stand 46 is disposed downstream of oven 56 and is comprised of two rows of vertically and laterally spaced drive rollers 58 and a pinch roller 59. Roll stand 46 pulls the parallel array of lines 10 from the first roll stand 44 and through oven 56.

To obtain the desired physical properties in line 10, it is important both to stretch the line while it is being heated in oven 56 and to obtain the desired degree of crystallization of the nylon polymer material prior to heating and stretching. Stretching the line during the heating step provides parallel orientation of the molecular structure within the two strands 12 and 14 of line 10 and is achieved by providing a differential between the rotational velocities of the drive rollers 50 and 54 in the first roll stand 44 and the drive rollers 58 in the second roll stand 46. All of the drive rollers in the three roll stands are preferably of the same size. Accordingly, by rotating the drive rollers 58 in the second roll stand 46 more rapidly than the drive rollers 50 and 54 in the first roll stand 44, the lines 10 are stretched as they are pulled through oven 56.

The amount of crystallization which occurs in the molten strands prior to heating and stretching is a function of the particular material being used, the temperature of the quench water and the quench time (time during which the line is submerged in the quench tank). The quench time depends on the velocity at which the lines are pulled through the tank and the length of underwater travel. From a commercial standpoint, it is desirable to maximize line output per unit time. This is preferably achieved in the present invention by extending the length of the quench tank 34 which allows the roll stands to operate at higher rotational velocities without decreasing quench time. It has also been found to be desirable to operate the roll stands at constant velocities and thus variations in the line material can be most easily accommodated by variations in the temperature of the quench water.

By way of example, when using a ten hole die to extrude concurrently five pair of double-strand lines 10 using the aforesaid preferred nylon copolymer no. 8218, wherein the strands 12 and 14 are 0.080 inch in diameter, the diameters of die holes 32 are each 0.176 inch. The water temperature in tank 34 is preferably 60° F. The vertical spacing between the lower face of the extrusion die 28 in pot 30 and the surfaces of the water in tank 34, which is preferred to as the air gap, is 8 inches. As in the extrusion of single-strand monofilament line, this distance can vary from about 1 inch to 10 inches depending on the viscosity of the material used, the diameter of the strands being extruded and the draw-down ratios employed. The larger the diameter of the strands being formed and the less the draw-down ratio, the shorter the air gap. More viscous melts will require larger air gaps. To form a strong weld between the strands, the strand contact point 33 should be about 2 to 4 inches below the surface of the water. For a light weld between the strands, this depth would be increased up to about 15 inches. The melt temperature is about 420° to 480° F. and the quench tank 34 is about six feet in length by three feet in depth. The rotational velocity of the drive rollers in the first roll stand 44 is 44.1 feet per minute. To provide the proper orientation of the molecular structure of the two stands in each length of line 10 so as to achieve the desired line strength and durability characteristics, oven 56 is maintained at about 580° F. and the ratio of the relative rotational speeds of the drive rollers 58 in the second roll stand 46 to the speed of the drive rollers 50 and 54 in the first roll stand 44 is about 3.1 to 1. Accordingly, the rotational speed of the drive rollers 50 and 54 in the second roll stand 46 in the present example is 136.71 feet per minute.

Orienting the strands by aforesaid stretching and heating places considerable stress on the strands. To provide the desired strength and durability in the final product, it is desirable to relieve this stress. This is accomplished in the present invention by subjecting the pairs of joined strands 12 and 14 to a second heating step. In the second heating step, however, the joined strands are in a relaxed state as opposed to being stretched during the first heating step. To provide the second heating step, a second oven 60 is disposed downstream of the second roll stand 46. The third roll stand 48 is positioned downstream of the second oven 60 to pull the lengths of line 10 through oven 60. Roll stand 48 preferably comprises a pinch roller 62 and three drive rollers 64 vertically and horizontally spaced apart as shown in FIG. 2. To pull the lines 10 through oven 62 in a relaxed state, the drive rollers of roll stand 48 are rotated at a rate about two to ten percent slower than the drive rollers 58 of the second roll stand 46. Thus, in the above example, rollers 58 would be driven at about 132.6 feet per minute, based on a 3 percent speed reduction. The second oven 60 is maintained at a slightly lower temperature than oven 56, preferably about 540° F.

A second quench tank 66 is disposed downstream of the third roll stand 48 to moisten the monofilament line prior to spooling as spooled line is inhibited from absorbing from moisture in the air which is desirable in freshly extruded nylon line from a strength standpoint. A suitable line guide 68 is provided in the lower portion of quench tank 66 to define an underwater path for the line through tank 66. the water in tank 66 is maintained at about the same temperature as the water in tank 34 to cool the formed line prior to spooling. Finally, a conventional spooling assembly 70 is deployed in the assembly line downstream of quench tank 66 wherein each of the individual double-strand lines 10 formed by the aforesaid process are individually wrapped about separate spools 72 for storage and shipment. In the example set forth above, five separate spools would be wound with line 10 by assembly 70 and a total of 199.5 pounds of line 10 would be produced per hour, based on 402 feet of line per pound.

In a second example, four pair of double-strand line 10 of the same nylon copolymer, have been formed using an eight-hole die 28, wherein the individual strands 12 and 14 are each 0.095 inch in diameter, the diameters of the die holes are each 0.260 inch. The melt temperature, water temperatures and oven temperatures are all the same as in the prior example. Because the line being formed is comprised of strands of greater diameter than the line in the prior example, the air gap is six inches. The initial strand contact points 33 are again 2 to 4 inches below the surface of the water for a very strong weld and up to about 15 inches below the surface for very light welds. The rotational velocity of the drive rollers in the first roll stand 44 is 37.9 feet per minute. The velocity of the drive rollers in the second roll stand 46 is 117.49 fpm, and in the third roll stand is 113.96 fpm. In this example 200.97 pounds of line would be produced per hour at 275 feet per pound.

Various changes and modifications may be made in carrying out the present invention without departing from the spirit and scope thereof. Insofar as these changes and modifications are within the purview of the appended claims, they are to be considered as part of the present invention.

I claim:

1. An assembly for continuously forming a flexible cutting line comprised of two monofilament strands joined together in a side by side disposition by a severable weld of desired strength for use in rotary vegetation trimmers, said assembly comprising:

a die for extruding a plurality of pairs of molten monofilament strands wherein the strands in each pair are in proximate disposition;

a cooling quench bath disposed below said die;

a collecting guide adjustably mounted in said bath for receiving said pairs of strands from said die and directing the strands in each of said pairs together at a selected depth within said bath to initiate the forming of the severable weld of desired strength therebetween;

a plurality of guide members mounted in said quench bath downstream of said collecting guide for directing said pairs of strands from said collecting guide through said quench bath in a parallel array of pairs of joined strands;

a first roll stand for pulling said array of joined strands through said quench bath at a first velocity;

a heated oven;

a second roll stand for pulling said array of joined strands through said first oven at a second velocity, said second velocity being greater than said first velocity whereby said strands are stretched while being heated in said oven; and a line collecting assembly for individually collecting said pairs of joined strands.

2. The assembly of claim 1 including a second heated oven disposed down stream of said second roll stand, and a third roll stand for pulling said array of joined strands through said second oven at a third velocity, said third velocity being less than said second velocity whereby said joined strands are in a relaxed state while being heated in said second oven.

3. The assembly of claim 2 including a second bath disposed between said third roll stand and said line collecting apparatus for adding moisture to said pairs of joined strands prior to being collected.

4. The assembly of claim 2 wherein said collecting guide comprises an elongated member extending transversely across said quench bath below the surface thereof, said member defining a plurality of curvilinear guide surfaces thereon for directing said strands from said die to said guide assembly and a plurality of raised guide elements disposed adjacent said guide surfaces for separating said guide surfaces and directing said strands in each of said pairs together adjacent said guide surfaces to initiate the formation of said weld.

5. An assembly for continuously forming a flexible cutting line comprised of two monofilament strands joined together in a side by side disposition by a severable weld of desired strength for use in rotary vegetation trimmers, said assembly comprising:

a die for extruding a plurality of pairs of molten monofilament strands wherein the strands in each pair are in proximate disposition;

a cooling quench bath disposed below said die;

a collecting guide adjustably mounted in said quench bath for receiving said pairs of strands from said die and directing the strands in each of said pairs together at a selected depth within said bath to initiate the forming of the severable weld of desired strength therebetween;

a plurality of guide members mounted in said quench bath down stream of said collecting guide for directing said pairs of strands from said collecting guide through said bath in a parallel array of pairs of joined strands;

a first roll stand for pulling said array of joined strands through said quench bath at a first velocity;

a first heated oven;

a second roll stand for pulling said array of joined strands through said first oven at a second velocity, said second velocity being greater than said first whereby said joined strands are scratched while being heated in said first oven;

a second heated oven;

a third roll stand for pulling said array of joined strands through said second oven at a third velocity, said third velocity being less than said second velocity whereby said joined strands are in a relaxed state while being heated in said second oven;

a second bath; and a line collecting assembly for pulling said array of joined strands through said second bath and individually collecting said joined pairs of strands.

6. The assembly of claim 5 wherein said collecting guide comprises an elongated member extending transversely across said quench bath below the surface thereof, said member defining a plurality of curvilinear guide surfaces thereon for directing said strands from said die to said guide assembly and a plurality of raised guide elements disposed adjacent said guide surfaces for separating said guide surfaces and directing said strands in each of said pairs together adjacent said guide surfaces to initiate the formation of said weld.

7. The assembly of claim 5 wherein said second velocity is about three times greater than said first velocity and said third velocity is about two to ten percent less than said second velocity.

8. The assembly of claim 5 including adjustable members for mounting said collecting guide from about two to fifteen inches below the surface of said first quench bath.

9. The assembly of claim 5 wherein said die defines a plurality of pairs of apertures therein and wherein the apertures in each pair are spaced apart a distance within the range of $1/16$ to $3/8$ inches.

10. An assembly for continuously forming a flexible cutting line comprised of two monofilament strands joined together in a side by side disposition by a severable weld for use in rotary vegetation trimmers, said assembly comprising:

a die for extruding a plurality of pairs of molten monofilament strands wherein the strands in each pair are in proximate disposition;

a cooling quench bath disposed below said die;

a guide assembly mounted in said quench bath for receiving said pairs of strands from said die and directing the strands in each of said pairs together within said bath to initiate the forming of severable welds therebetween, said assembly including guide members for directing said pairs of strands through said bath in a parallel array of pairs of joined strands;

a first roll stand for pulling said array of joined strands through said quench bath;

a heated oven;

a second roll stand for pulling said array of joined strands through said oven; and a line collecting assembly for individually collecting said pairs of joined strands.

11. The assembly of claim 10 wherein said guide assembly includes a collecting guide adjustably mounted at varying elevations in said bath for receiving said pairs of strands from said die and directing the strands in each of said pairs together at a selected depth within said quench bath to initiate the forming of the severable weld therebetween and determine the strength thereof.

12. The assembly of claim 10 including a second heated oven disposed downstream of said second roll stand and a third roll stand disposed between said second heated oven and said line collecting assembly for pulling said array of pairs of joined strands through said second oven.

13. The assembly of claim 11 including adjustable members for mounting said collecting guide in said quench bath from about two to fifteen inches below the surface thereof.

14. The assembly of claim 11 wherein said collecting guide comprises an elongated member extending transversely across said quench bath below the surface thereof, said member defining a plurality of curvilinear guide surfaces thereon for directing said strands from said die to said guide assembly and a plurality of raised guide elements disposed adjacent said guide surfaces for separating said guide surfaces and directing said strands in each of said pairs together adjacent said guide surfaces to initiate the formation of said weld.

15. The assembly of claim 12 including a second quench bath disposed between said second oven and said collecting assembly for adding moisture to said pairs of joined strands prior to the collection thereof, said collecting assembly pulling said joined strands through said second quench bath.

16. An assembly for forming a flexible cutting line comprised of two monofilament strands joined together in a side by side disposition by a severable weld of desired strength for use in rotary vegetation trimmers, said assembly comprising:
    a die for extruding at least one pair of molten monofilament strands in proximate disposition;
    a cooling quench bath disposed below said die;
    a collecting guide adjustably mounted in said quench bath for receiving said pair of strands from said die and directing the strands together at a selected depth within said bath to initiated the forming of the severable weld of desired strength therebetween;
    a guide assembly mounted in said bath down stream of said collecting guide for directing said pair of strands from said collecting guide through said quench bath in an adjacent disposition joined by said weld;
    a first roll stand for pulling said joined strands through said quench bath at a first velocity;
    a heated oven;
    a second roll stand for pulling said joined strands through said oven at a second velocity, said second velocity being greater than said first velocity whereby said joined strands are stretched while being heated in said first oven; and
    a line collecting assembly disposed down stream of said second roll stand for collecting said joined strands.

17. The assembly of claim 16 including a second heated oven disposed down stream of said first roll stand and a third roll stand for pulling said pair of joined strands through said second oven at a third velocity, said third selected velocity being less than said second velocity whereby said joined strands are in a relaxed state while being heated in said second oven.

18. The assembly of claim 17 including a second quench bath disposed between said second oven and said collecting assembly and a guide member disposed in said second bath for directing said joined strands through said quench tank whereby moisture is added to said strands prior to the gathering thereof.

19. The assembly of claim 17 wherein said guide assembly in said quench bath comprises a pair of carriages, said carriages being disposed proximate opposite ends of said quench bath, each of said carriages comprising a plurality of cylindrical guide members thereon extending transversely in said quench bath and collectively defining a smooth support path through said bath.

20. An assembly for forming a flexible cutting line comprised of two monofilament strands joined together in a side by side disposition by a severable weld for use in rotary vegetation trimmers, said assembly comprising:
    a die for extruding at least one pair of molten monofilament strands in proximate disposition;
    a cooling quench bath disposed below said die;
    a collecting guide assembly mounted in said bath for receiving said pair of strands from said die and directing said strands together at a selected depth within said quench bath to initiate the forming of the severable weld of desired strength therebetween, said collecting guide assembly including a plurality of curvilinear guide surfaces, a plurality of raised guide elements disposed adjacent said guide surfaces for separating said guide surfaces and directing said strands in each of said pairs together adjacent said guide surfaces to initiate the formation of said weld, and a mounting assembly for varying the elevation of said guide surfaces within said quench bath whereby the strength of said weld can be varied;
    a guide assembly mounted in said quench bath downstream of said collecting guide assembly for directing said pairs of strands from said collecting guide assembly through said bath in a parallel array of pairs of joined strands;
    a first roll stand for pulling said array of joined strands through said quench bath;
    a heated oven;
    a second roll stand for pulling said array of joined strands through said oven; and
    a line collecting assembly for individually collecting said pairs of joined strands.

21. The assembly of claim 20 including a second heated oven disposed downstream of said second roll stand and a third roll stand disposed between said second heated oven and said line collecting assembly for pulling said array of pairs of joined strands through said second oven.

22. The assembly of claim 21 including a second bath disposed between said third roll stand and said line collecting assembly for adding moisture to said pairs of joined strands prior to being collected.

23. An assembly for continuously forming a flexible cutting line comprised of two monofilament strands joined together in a side by side disposition by a severable weld for use in rotary vegetation trimmers, said assembly comprising:
    a die for extruding a plurality of pairs of molten monofilament strands wherein the strands in each pair are in proximate disposition;
    a cooling quench bath disposed below said die;
    a collecting guide adjustably mounted in said bath for receiving said pairs of strands from said die and directing the strands in each of said pairs together at a selected depth within said bath to initiate the forming of the severable weld of desired strength therebetween;
    a guide assembly mounted in said quench bath downstream of said collecting guide for directing said pairs of strands from said collecting guide through said quench bath in a parallel array of joined strands;

a first roll stand for pulling said array of joined strands through said quench bath;

a heated oven;

a second roll stand for pulling said array of joined strands through said oven; and a line collecting assembly for individually collecting said pairs of joined strands.

24. The assembly of claim 23 including a second heated oven disposed downstream of said second roll stand and a third roll stand disposed between said second heated oven and said line collecting assembly for pulling said array of pairs of joined strands through said second oven.

* * * * *